United States Patent [19]

Schuler

[11] 4,353,376
[45] Oct. 12, 1982

[54] COMBINE HAVING SEPARATING AND CLEANING APPARATUS

[76] Inventor: Murry W. Schuler, Box 66, Rte. #2, Griswold, Iowa 51535

[21] Appl. No.: 243,122

[22] Filed: Mar. 12, 1981

[51] Int. Cl.³ .............................................. A01F 7/06
[52] U.S. Cl. ................................... 130/27 T; 56/14.6; 130/27 Z
[58] Field of Search ................. 130/27 T, 27 Z, 27 R; 56/14.6

[56] References Cited

U.S. PATENT DOCUMENTS

| 3,797,502 | 3/1975 | Reed et al. | 130/27 Z |
| 4,108,150 | 8/1978 | Shaver | 130/27 T |
| 4,274,426 | 6/1981 | Williams | 130/27 T |

*Primary Examiner*—Jay N. Eskovitz
*Attorney, Agent, or Firm*—Zarley, McKee, Thomte, Voorhees & Sease

[57] ABSTRACT

A combine includes a longitudinally extending auger mounted in a tubular casing and provided with spiral flighting for conveying cut crop material rearwardly between the exterior surface of the auger and the interior surface of the tubular casing. A longiutidnally extending threshing rotor is mounted on the rearward end of the auger for rotation therewith. A longitudinally extending concave embraces the rotor and is spaced from the rotor to define a threshing space therebetween. The concave includes a grate at its lower end, and an impeller is positioned below the grate for propelling grain and chaff downwardly from said grate toward the sieves and chaffing device below. The chaffing device includes a fan having two outlets for blowing the chaff away from the grain both above and below the sieves. A plurality of spring fingers are located below the impeller for engaging the grain.

9 Claims, 3 Drawing Figures

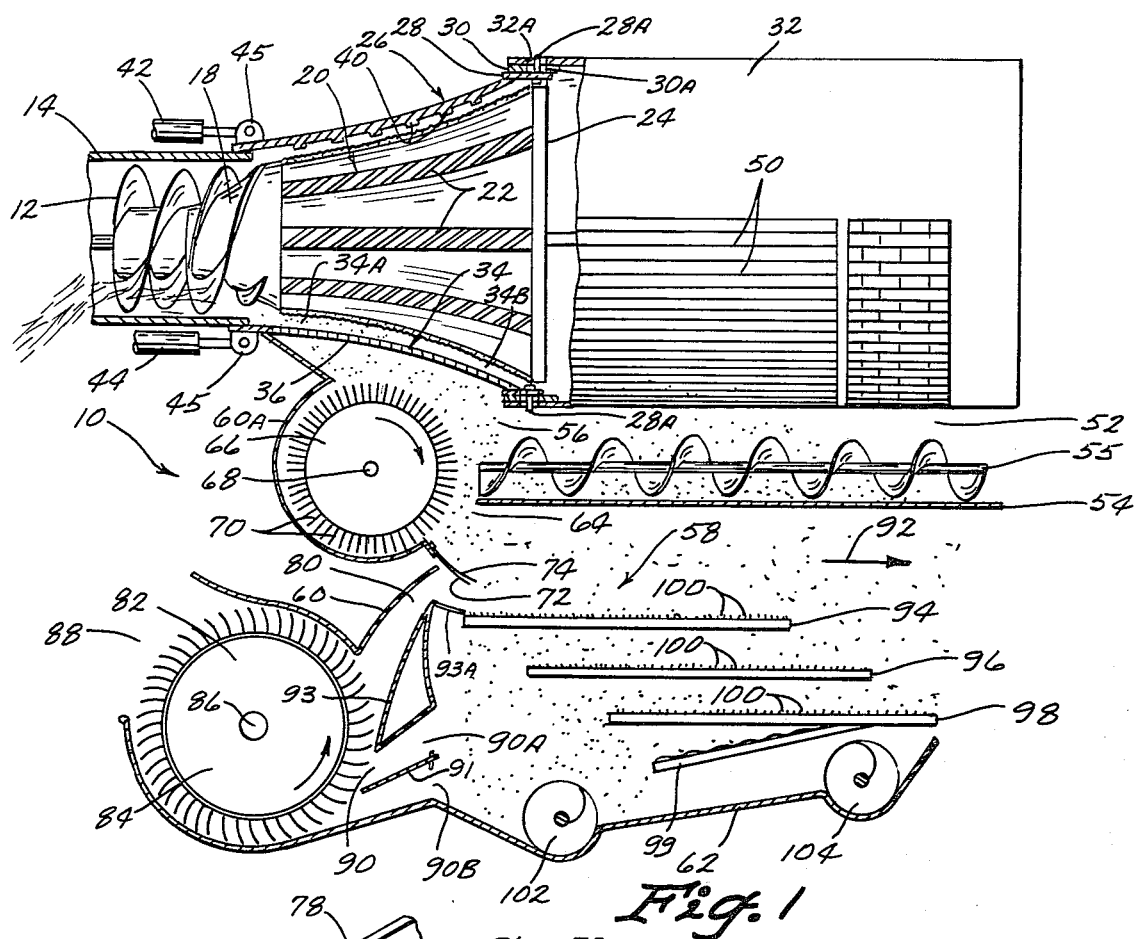
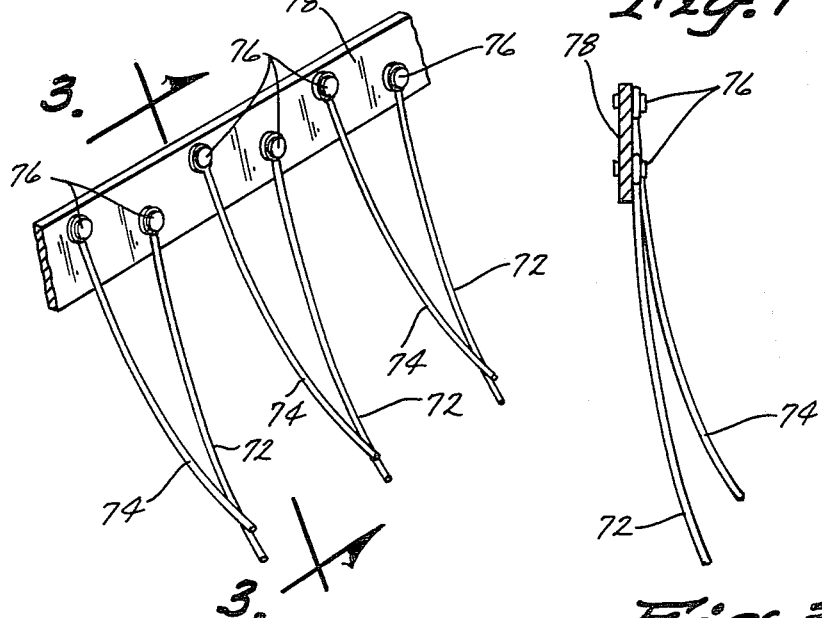
Fig. 1
Fig. 2
Fig. 3

COMBINE HAVING SEPARATING AND CLEANING APPARATUS

BACKGROUND OF THE INVENTION

This invention relates to a combine and more particularly to a combine which may be described as being of the axial flow type. Generally speaking, combines historically included a threshing cylinder which was transversely mounted in the combine with respect to the flow of crop material therethrough. A concave was normally positioned at the lower portion of the cylinder so that the cut crop material would be forced between the exterior surface of the cylinder and the concave to thresh and separate the grain from the chaff and straw.

A recent development in the combine art has been the axial flow type combines wherein the threshing cylinder is positioned in the combine in a longitudinally extending manner. For example, the Sperry-New Holland TR 70 combine employs a pair of threshing cylinders or rotors which are mounted in tubular members having concaves or grates at the lower end thereof. While the axial flow combines such as that of Sperry-New Holland are regarded by some as to be an improvement in the art, the instant invention is believed to achieve more uniform combining action with less grain damage.

Another problem encountered with axial type combines is the difficulty in separating the chaff from the grain after it has exited from the grate of the concave. A system of sieves and fans has been provided for blowing the chaff away from the grain and for permitting the grain to sift downwardly through the sieves to augers which carry the grain away.

However, with axial flow combines, it is necessary to carry the grain away from the concave as quickly as possible so as to make room for newly combined grain. Furthermore, increased inter-action between the blown air, the grain, and the chaff, are required in order to provide a more complete and speedy separation of the grain from the chaff.

It is therefore a principal object of the invention to provide an improved combine having an improved separating and cleaning apparatus.

A further object of the present invention is to provide an improved combine having an impeller located adjacent the bottom of the concave for propelling the grain downwardly toward the sieves and chaffing apparatus.

A further object of the present invention is the provision of an improved combine having a plurality of fingers located immediately below the impeller and immediately above the chaffing fan for engaging the grain and chaff and permitting the air to mix more thoroughly with the grain and the chaff so as to accomplish more efficient separation.

These and other objects will be apparent to those skilled in the art.

BRIEF DESCRIPTION OF THE DRAWINGS

FIG. 1 is a side sectional view of a combine illustrating the threshing cylinder, concave, impeller, sieves, and chaffing fan of this invention.

FIG. 2 is an enlarged perspective view of the spring fingers located below the impeller.

FIG. 3 is a sectional view taken along line 3—3 of FIG. 2.

SUMMARY OF THE INVENTION

A combine having separating and cleaning apparatus is disclosed. Located immediately below the grate of the combine concave is an impeller which is adapted to engage the grain and propel it downwardly toward the sieves and chaffing means. Located immediately below the impeller are a plurality of spring fingers which engage the downwardly moving grain and cause the grain and air to be mixed more thoroughly so that the chaff can be separated from the grain more thoroughly. The chaffing means of the present invention utilizes a fan having two conventional outlets. One of the outlets is directed above the upper surface of the sieve and the other of the outlets is directed below the upper surface of the sieves. The upper outlet also directs a stream of air through the spring fingers so that the air becomes mixed with the chaff and grain thoroughly as the grain and chaff engage the fingers.

DESCRIPTION OF THE PREFERRED EMBODIMENT

The numeral 10 refers generally to a combine, the threshing portion of which is disclosed in U.S. Pat. No. 4,249,542, issued Feb. 10, 1981. The numeral 12 refers to an auger which is rotatably mounted in a casing or tubular member 14 so that the cut crop material will be conveyed rearwardly from the header (not shown) towards the threshing portion of the combine. The cut crop material is conveyed rearwardly through the casing 14 between the exterior surface of the auger 12 and the interior surface of the casing 14. The rearward portion of auger 12 includes a frusto-conical shaped portion referred to generally by the reference numeral 18.

The numeral 20 refers to the threshing cylinder or rotor portion and is seen to have a flared configuration so that the rearward end thereof has a larger diameter than the forward end thereof. A plurality of rasp bars 22 are operatively secured to the rearward end of the auger 12 and extend rearwardly and outwardly therefrom. The rasp bars 22 are curved along their length. The rearward ends of the rasp bars 22 are secured to a disc member 24. The configuration of the cylinder 20 is flared rather than frusto-conical. In other words, the configuration of cylinder 20 is bell-shaped.

A concave 26 is positioned around cylinder 20 and also has a flared or bell-shaped configuration. The forward end of concave 26 embraces the rearward end of casing 14. The rearward end of concave 26 is provided with a support 28 which is movably received within ring 30 provided at the inner forward end of a tubular separator member 32. Guide pins 28A extend through elongated slots 30A in ring 30 and slots 23A in tubular member 32 to keep the concave 26 from rotating with the cylinder 20.

The longitudinal cross-sectional configuration of cylinder 20 and concave 26 is slightly different so that the clearance between the cylinder 20 and the concave 26 at the forward end of cylinder 20 is normally larger than the clearance between the rearward ends of cylinder 20 and concave 26. The tapered space between the exterior surface of cylinder 20 and the interior surface of concave 26 will be referred to generally by the reference numeral 34.

Concave 26 is provided with conventional rods and wires (not shown) to achieve an open-grate designated generally by the numeral 36. It should be noted that concave 26 is of the open-grate type for approximately 80% of its surface inasmuch as the upper 20% of concave 26 is closed and is provided with spiral flighting 40 at the interior surface thereof. The purpose of the spiral flighting 40 is to provide to the cut crop material a controlled movement to the discharge end of the concave.

The numerals 42 and 44 refer to power cylinders which are secured to ears 45 at the forward end of concave 26 and which may be actuated to longitudinally move concave 26 relative to cylinder 20 as will be described in more detail hereinafter. The cylinders 42 and 44 can be disposed at the sides of the unit rather than at the top and bottom thereof if more clearance is needed for the incoming grain.

Double flighting may be used as required on auger 12 to insure that an adequate supply of grain is provided to the unit.

In operation, auger 12 is rotated so that the cut crop material will be conveyed rearwardly through the casing 14. Rotation of the auger 12 also causes rotation of the cylinder 20. The cut crop material is delivered to the threshing space 34 at the forward end of cylinder 20 in the area referred to generally by the reference numeral 34A. The rotating cylinder 20 threshes and at least partially separates the grain from the chaff and straw due to the action of the rasp bars 22 striking the crop material. A portion of the grain drops through the open-grate portion of the concave 26 in conventional fashion. The spiral flighting 40 as well as the centrifugal action of the rotating cylinder 20 causes the material to be given a controlled movement to the discharge end of the threshing space 34 which is referred to by the reference numeral 34B. As seen in the drawings, the cross-sectional area of the threshing space 34 decreases from 34A to 34B. The configuration of the threshing space as well as the increased rim speed of the cylinder 20 adjacent its rearward end cooperate to give threshing of the crop material reaching the rearward area of the threshing space 34 which has not been previously threshed or separated.

The threshing space 34 may be easily varied by simply actuating the hydraulic cylinders 42 and 44 to longitudinally move concave 26 relative to cylinder 20. The fact that the cross-sectional area of threshing space 34 may be easily varied permits the combine to be readily adaptable for crop conditions, different crops, etc. The threshing space 34 may be easily changed from the operator's cab. It can be appreciated that retraction of the rods within the cylinders 42 and 44 will cause the forward movement of the concave 26 relative to the cylinder 20 which will obviously change the cross-sectional area of threshing space 34. Conversely, extension of the rods from cylinders 42 and 44 will move the concave 26 rearwardly with respect to the cylinder 20 so that the cross-sectional area of space 34 or the clearance between the cylinder 20 and concave 26 will be changed as indicated.

The foregoing combine structure has a much greater grain capacity, and this invention is directed to a separating and cleaning apparatus that can handle greater amounts of grain than conventional apparatus.

Separator member 32 is located rearwardly of the discharge end 34B of tapered space 34. A minimal amount of grain passes outwardly through discharge end 34B into separator member 32. Member 32 has a plurality of slats and openings 50 which permit the grain and chaff to pass downwardly out of member 32 into a return chamber 52 formed between the lower end of tubular member 32 and a horizontal wall 54. Housed within chamber 52 are a plurality of return augers 55 which are adapted to return the grain and chaff to the discharge end 56 of return chamber 54. Discharge chamber 56 is located immediately below grate 36.

A majority of the grain being threshed passes downwardly through grate 36, rather than passing axially into tube 32. The grain and chaff which passes downwardly through grate 36 enters a cleaning and chaffing chamber 58 which is formed by a front housing wall 60, a bottom wall 62, and horizontal wall 54. The upper end of chamber 58 includes an inlet opening 64 which is located below grate 36 and in communication therewith.

An impeller drum 66 is positioned adjacent grate 36 and also adjacent inlet opening 64, and is rotatably mounted about a horizontal axis 68. Mounted around the outer peripheral edge of drum 66 are a plurality of impeller blades 70. Power means (not shown) are provided for rotating drum 66 in a clockwise direction so that blades 70 engage the grain and chaff exiting from grate 36 and propel the grain and chaff downwardly into cleaning and chaffing chamber 58. Impeller 66 also engages the grain and chaff exiting from discharge end 56 of return chamber 52, and forces this grain downwardly into cleaning and chaffing chamber 58. Impeller 66 is important because it accelerates the grain and chaff and moves it more quickly into the cleaning and chaffing chamber than would be the case without the use of such an impeller.

Located immediately adjacent the lower edge of impeller 66 are a plurality of spring fingers 72, 74, each of which is mounted adjacent its upper end by means of a rivet or bolt 76 to a mounting plate 78. Mounting plate 78 is operatively secured to front housing wall 60A immediately adjacent the lower edge of drum 66, and fingers 72, 74 project outwardly into the path of the grain and chaff which is being forced downwardly by drum 66. The fingers tend to break up the downwardly rushing stream of grain and chaff, and cause the grain and chaff to mix thoroughly with air which is being forced outwardly through an upper outlet opening 80 of a chaffing fan 82.

Chaffing fan 82 includes a rotating drum 84, rotating about a horizontal axis 86, and having an inlet opening 88 and two outlet openings 80 and 90. Upper outlet opening 80 is located immediately behind and below fingers 72, 74 so that air exits outlet opening 80 and passes into the broken up stream of downwardly rushing grain and chaff. This causes the chaff to be separated from the grain and blown outwardly in the general direction indicated by the arrow 92.

Upper and lower outlet openings 80, 90 of chaffing fan 82 are separated by a triangular baffle plate 93. Buffer plate 93A is secured to the upper portion of plate 93 to prevent grain from falling downwardly between plate 93 and sieve member 94. Outlet opening 90 is also broken into two segments 90A and 90B by a movable baffle 91 which may be adjusted to achieve the desired directional control of air exiting from opening 90.

Mounted in a horizontal and parallel spaced apart relationship within chamber 58 are several sieve members 94, 96, 98 having a plurality of upwardly extending wire fingers 100 on their upper surface. Sieves 94, 96, 98 are adapted to shake back and forth in a reciprocating fashion commonly encountered in combines. Conventional plate 99 prevents grain from falling to the bottom of bottom wall 62. The grain sifts downwardly through the sieves and falls to the bottom of cleaning chamber 58 where it is carried away by discharge augers 102, 104. The air exiting from upper outlet opening 80 blows the chaff outwardly to the right in the direction indicated by arrow 92 where it is ultimately discharged onto the ground. Similarly air passing outwardly through the lower outlet opening of fan 82 passes horizontally through the spaces between sieves 94, 96 and further causes the chaff to be moved outwardly for discharge onto the ground. The grain being heavier passes downwardly, whereas the chaff is blown away by the wind from fan 82.

The present invention improves upon prior art combines by utilizing a drum such as drum 66 to increase the speed with which the grain and chaff are forced downwardly into the cleaning chamber 58. This enables the device to handle a much higher volume of grain per given unit of time than in prior devices. Similarly, fingers 72, 74 cause the downward stream of grain and chaff to be broken up so that the air will mix more freely with it and remove the chaff from the grain. This separation is further enhanced by the provision of a second upper outlet opening 80.

Thus, it can be seen that the device accomplishes at least all of its stated objectives.

What is claimed is:

1. A combine comprising:
   a longitudinally extending auger having forward and rearward ends;
   means for rotating said auger;
   a first auger casing surrounding said auger in spaced relation thereto, said first auger casing having forward and rearward ends positioned adjacent said forward and rearward ends of said auger;
   a longitudinally extending threshing rotor having a forward end connected to said rearward end of said auger for rotation therewith, and having a rearward end;
   a longitudinally extending concave surrounding said threshing rotor in spaced relation therewith to define a threshing space therebetween;
   said concave including grate means located below said rotor for permitting threshed grain and chaff to fall downwardly and out of said threshing space;
   a housing forming a cleaning chamber below said concave, said cleaning chamber having an inlet opening in communication with said grate means of said concave;
   sieve means within said chamber below said inlet opening;
   chaffer means within said chamber for directing a stream of air over said sieve means to separate the chaff from the threshed grain;
   conveyor means below said sieve means for carrying grain outside said housing after said grain falls through said sieve means; and
   impeller means located within said housing adjacent said inlet opening for engaging the grain and chaff falling from said grate into said inlet opening and propelling said grain and chaff downwardly toward said sieve means;
   wherein said impeller means comprising a drum rotatably mounted to said housing for rotation about a horizontal axis, said drum having a plurality of radially extending blades for engaging said grain and chaff falling from said grate means into said inlet opening.

2. A combine according to claim 1 wherein said chaffer means comprises a fan means having first and second fan exhaust openings, said first fan exhaust opening being directed above said sieve means and said second fan exhaust opening being directed below the uppermost surface of said sieve means.

3. A combine according to claim 1 wherein a cylindrical separator means is positioned rearwardly of said rotor for receiving grain and chaff which progresses axially beyond said rearward end of said rotor, said separator having separator grate means therein for permitting grain and chaff to fall downwardly out of said separator means, auger means being positioned below said separator grate means and having a discharge end in communication with said inlet opening of said housing whereby said auger means will carry said grain and chaff falling from said separator grate means to said inlet opening of said housing.

4. A combine according to claim 1 wherein said rotor has an accurately flared configuration with its said rearward end having a larger diameter than its said forward end, and said concave having an arcuately flared configuration with its said rearward end having a larger diameter than its said forward end.

5. A combine according to claim 4 comprising means for longitudinally adjustably moving said concave relative to said cylinder whereby the cross-sectional area of said threshing space may be selectively varied.

6. A combine comprising:
   a threshing compartment and grain threshing means therein,
   a housing forming a cleaning chamber below said threshing compartment and having an inlet opening adapted to receive a supply of threshed grain from said threshing means,
   cleaning means in said cleaning chamber for cleaning grain and separating grain from chaff,
   and impeller means located within said housing in contact with said supply of threshed grain for propelling said grain downwardly into said chamber;
   said impeller means comprising a drum rotatably mounted to said housing for rotation about a horizontal axis, said drum having a plurality of radially extending blades for engaging said grain and chaff falling from said grate means into said inlet opening.

7. The combine according to claim 6 wherein said cleaning means includes sieve means, and wherein a fan means is in communication with said cleaning chamber, said fan means having first and second fan exhaust openings, said first fan exhaust opening being directed above said sieve means and said second fan exhaust opening being directed below the uppermost surface of said sieve means.

8. A combine comprising:
   a threshing compartment and grain threshing means therein,
   a housing forming a cleaning chamber below said threshing compartment and having an inlet opening adapted to receive a supply of threshed grain from said threshing means,
   cleaning means in said cleaning chamber for cleaning grain and separating grain from chaff,
   and impeller means located within said housing in contact with said supply of threshed grain for propelling said grain downwardly into said chamber;
   a plurality of irregularly shaped spring fingers being positioned below and adjacent said impeller means for engaging said grain and chaff immediately after said grain and chaff are propelled downwardly from said impeller means.

9. A combine comprising:
a longitudinally extending auger having forward and rearward ends;
means for rotating said auger;
a first auger casing surrounding said auger in spaced relation thereto, said first auger casing having forward and rearward ends positioned adjacent said forward and rearward ends of said auger;
a longitudinally extending threshing rotor having a forward end connected to said rearward end of said auger for rotation therewith, and having a rearward end;
a longitudinally extending concave surrounding said threshing rotor in spaced relation therewith to define a threshing space therebetween;
said concave including grate means located below said rotor for permitting threshed grain and chaff to fall downwardly and out of said threshing space;
a housing forming a cleaning chamber below said concave, said cleaning chamber having an inlet opening in communication with said grate means of said concave;
sieve means within said chamber below said inlet opening;
chaffer means within said chamber for directing a stream of air over said sieve means to separate the chaff from the threshed grain;
conveyor means below said sieve means for carrying grain outside said housing after said grain falls through said sieve means; and
impeller means located within said housing adjacent said inlet opening for engaging the grain and chaff falling from said grate into said inlet opening and propelling said grain and chaff downwardly toward said sieve means;
a plurality of irregularly shaped spring fingers being positioned below and adjacent said impeller means for engaging said grain and chaff immediately after said grain and chaff is propelled downwardly from said impeller means.

* * * * *